United States Patent
Krakowiecki et al.

(10) Patent No.: US 10,204,161 B1
(45) Date of Patent: *Feb. 12, 2019

(54) METHOD AND APPARATUS FOR FACILITATING DATA MANAGEMENT

(75) Inventors: Matthew Krakowiecki, Denver, CO (US); Pearl Kolling, Oakland, CA (US); Jack Mackouse, Walnut Creek, CA (US); Kevin Rhein, Minnetonka, MN (US); Elizabeth Hoople, Walnut Creek, CA (US); Kathy Yee, Orinda, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 12/268,044

(22) Filed: Nov. 10, 2008

Related U.S. Application Data

(63) Continuation of application No. 11/115,869, filed on Apr. 26, 2005, now Pat. No. 7,451,134.

(60) Provisional application No. 60/598,330, filed on Aug. 2, 2004.

(51) Int. Cl.
*G06F 17/30* (2006.01)

(52) U.S. Cl.
CPC .. *G06F 17/30864* (2013.01); *G06F 17/30598* (2013.01); *G06F 17/30867* (2013.01)

(58) Field of Classification Search
CPC ......... G06F 17/30412; G06F 17/30867; G06F 17/3053; G06F 17/30554; G06F 17/30864; G06F 17/3089; G06F 17/30991; G06F 17/30899

USPC ....... 707/769, 780, 722, 200, 913, 914, 737, 707/740, 758
See application file for complete search history.

(56) References Cited

U.S. PATENT DOCUMENTS

| | | |
|---|---|---|
| 4,346,442 A | 8/1982 | Musmanno |
| 4,376,978 A | 3/1983 | Musmanno |
| 4,597,046 A | 6/1986 | Musmanno et al. |
| 4,774,662 A | 9/1988 | Musmanno et al. |
| 5,193,055 A | 3/1993 | Brown et al. |

(Continued)

FOREIGN PATENT DOCUMENTS

| | | |
|---|---|---|
| EP | 1081664 | 3/2001 |
| EP | 1107149 | 6/2001 |

(Continued)

OTHER PUBLICATIONS

U.S. Appl. No. 12/324,581, filed Nov. 26, 2008, Krakowiecki et al.

(Continued)

*Primary Examiner* — James Trujillo
*Assistant Examiner* — Fariborz Khoshnoodi
(74) *Attorney, Agent, or Firm* — Foley & Lardner LLP

(57) ABSTRACT

A method and apparatus for facilitating data management over a network are described. In one embodiment, a request to display aggregate transaction data for a user is received, the aggregate transaction data containing data related to multiple disparate transactions organized into categories based on corresponding category codes and transaction codes associated with each transaction. The aggregate transaction data are retrieved from a database. A report containing the aggregate transaction data is generated and displayed for the user in a user interface area.

13 Claims, 11 Drawing Sheets

(56) References Cited

U.S. PATENT DOCUMENTS

| | | | |
|---|---|---|---|
| 5,710,889 A | | 1/1998 | Clark et al. |
| 5,826,243 A | | 10/1998 | Musmanno et al. |
| 5,842,185 A | * | 11/1998 | Chancey ................ G06Q 20/04 705/35 |
| 5,875,435 A | * | 2/1999 | Brown .................... G06Q 20/10 705/30 |
| 5,890,140 A | | 3/1999 | Clark et al. |
| 5,920,848 A | * | 7/1999 | Schutzer et al. ................. 705/42 |
| 5,933,816 A | | 8/1999 | Zeanah et al. |
| 5,940,809 A | | 8/1999 | Musmanno et al. |
| 6,058,378 A | | 5/2000 | Clark et al. |
| 6,073,119 A | | 6/2000 | Bornemisza-Wahr et al. |
| 6,173,270 B1 | | 1/2001 | Cristofich et al. |
| 6,324,523 B1 | | 11/2001 | Killeen, Jr. et al. |
| 6,332,126 B1 | | 12/2001 | Peirce et al. |
| 6,341,353 B1 | | 1/2002 | Herman et al. |
| 6,349,290 B1 | | 2/2002 | Horowitz et al. |
| 6,385,652 B1 | | 5/2002 | Brown et al. |
| 6,394,341 B1 | * | 5/2002 | Makipaa ................ G06Q 20/02 235/379 |
| 6,430,542 B1 | | 8/2002 | Moran |
| 6,697,824 B1 | | 2/2004 | Bowman-Amuah |
| 7,451,134 B2 | | 11/2008 | Krakowiecki |
| 8,676,677 B2 | * | 3/2014 | Rothman ........................ 705/35 |
| 2002/0091635 A1 | | 7/2002 | Dilip et al. |
| 2002/0095651 A1 | * | 7/2002 | Kumar .................... G06F 9/547 717/104 |
| 2002/0198806 A1 | | 12/2002 | Blagg et al. |
| 2003/0004751 A1 | | 1/2003 | Ng et al. |
| 2003/0018550 A1 | | 1/2003 | Rotman et al. |
| 2003/0061132 A1 | | 3/2003 | Yu et al. |
| 2003/0097331 A1 | | 5/2003 | Cohen |
| 2003/0101131 A1 | * | 5/2003 | Warren et al. .................. 705/38 |
| 2005/0121511 A1 | * | 6/2005 | Robbins, Jr. ........... G06Q 20/10 235/380 |
| 2005/0154751 A1 | * | 7/2005 | Levi ....................... G06Q 10/06 |
| 2005/0240526 A1 | | 10/2005 | Hill |
| 2006/0036586 A1 | * | 2/2006 | Krakowiecki et al. ........... 707/3 |

FOREIGN PATENT DOCUMENTS

| | | |
|---|---|---|
| EP | 1143362 | 10/2001 |
| WO | PCT 02/099576 | 12/2002 |

OTHER PUBLICATIONS

U.S. Appl. No. 12/324,637, filed Nov. 26, 2008, Krakowiecki et al.
Gaizauskas, et al. Coupling Information Retrieval and Information Extraction: A New Text Technology for Gathering Information from the Web. 1997. Proceedings of RIAO 97: computer-Assisted Information Searching on the Internet. Montreal, Canada.
http://www.wellsfargo.com Account Management.
http:///web.intuit.com/support/quicken/2000/mac/2226.html. Reconciling Online Bank Accounts, 2003.
http://www.fremontbank.com/personal_banking/pam/pam.htm. Personal Account Manager, 2004.

* cited by examiner

620

My Spending Report

You can use this report to monitor and track expenses at a glance because the data collection and input is done automatically. The report will contain details of your spending patterns made with your Wells Fargo Credit Card, Check Card, Checking Account, and Online Bill Pay Service, so you can see exactly where your money goes each month. How to use this report

Account Summary
- Brokerage
- Bill Pay
- Transfer
- Account Services
- My Message Center Watch your cash back rewards grow
Learn More
Get The Wells Fargo Cash back Platinum Card A Home Equity Loan Can Have tax advantage
Learn More

| Spending Summary /633 | Credit Cards /634 | Check Cards /635 | Other Checking Activity /636 | Bill Pay /637 |
|---|---|---|---|---|

Total Spending - All Payment Methods as of <mm/dd/yy>    Customize Report /632
Hide categories with $0.00
Click on column headings to sort

| Category | Month to Date | Feb | Jan | Feb&JanAve. |
|---|---|---|---|---|
| Airlines | $400.00 | $300.00 | $300.00 | $300.00 |
| Auto Rental | $400.00 | $300.00 | $300.00 | $300.00 |
| Education /640 | $0.00 | $0.00 | $0.00 | $0.00 |
| Gas/Automobile | $107.00 | $133.00 | $121.00 | $127.00 |
| Groceries | $346.00 | $333.00 | $342.00 | $337.00 |
| Healthcare | $0.00 | $0.00 | $0.00 | $0.00 |
| Household/Services/Utilities | $213.00 | $100.00 | $226.00 | $203.00 |
| Lodging /640 | $782.00 | $150.00 | $100.00 | $125.00 |
| Other Travel-Related & Entertainment | $234.00 | $212.00 | $231.00 | $221.00 |
| Restaurants | $890.00 | $865.00 | $576.00 | $730.00 |
| Retail/Department Stores | $0.00 | $0.00 | $0.00 | $0.00 |
| ATM Withdrawls[1] | $100.00 | $100.00 | $100.00 | $100.00 |
| Cash Advance form Credit Cards[1] | $0.00 | $1,000.00 /641 | $0.00 | $550.00 |
| Checks Written[2] /640 | $78.00 | $76.00 | $87.00 | $71.50 |
| Electronic Payment from Checking[2] | $87.00 | $87.00 | $98.00 | $92.50 |
| Non-Card Withdrawls form Checking[1] | $0.00 | $75.00 | $75.00 | $75.00 |
| Non-Categorized Card Transactions[1] | $1,168.00 | $1,266.00 | $1,317.00 | $1,291.50 |
| Non-Categorized Online Bill Pay Payments[2] | $28.00 | $56.00 | $54.00 | $55.00 |
| Transfers to Another Wells Fargo Account[2] /640 | $1,000.00 | $1,000.00 | $1,000.00 | $1,000.00 |
| Total Spending | $5,535.00 | $5,853.00 | $4,752.00 | $5,302.50 |
| Total Credit Card Spending | $1,69.00 | $2,226.00 | $1,252.00 | $1,739.00 |
| Total Check Card Spending | $2,396.00 | $2,288.00 | $2,144.00 | $2,216.00 |
| Total Other Checking Activity Spending | $1,145.00 | $1,236.00 | $1,240.00 | $1,239.00 |
| Total Bill Pay Spending | $104.00 | $101.00 | $116.00 | $106.50 |

[1] These categories cannot be defined within the individual merchant categories above.
[2] These categories cannot be defined within the individual merchant categories above, and my include payment to your Wells Fargo Credit Card. Tell me more Print this page only or print all pages
Save as PDF this page only or save all pages.    630

Need more information about these features? Read our Frequently Asked Questions

You will receive an email at the following address when a completed monthly report is ready:
Primary Email:test@wellsfargo.com Change email notification For more information regarding your Credit Card account, call 1-800-642-4720.
For more information regarding your Checking Account and Check Card, call 1-800-TO-WELLS. (For Portfolio Management Account SM (PMA) customers call 1-800-742-4923)
For more information regarding you Online Bill Pay Service, call 1-800-956-4442
Access additional mangement & planning tools from Wells Fargo Account Summary | Brokerage | Bill Pay | Transfers | My Message Center | Sign Off
Home | Map Center | Contact Us | Locations | Site Map | Apply

```
Site - Microsoft Internet Explorer
File  Edit  View  Favorites  Tools  Help
Back Forward Stop Refresh Home  Search  Favorites Fill Screen Print
Address F:/Combined Spending Reports\Business Requirements\Screens\Latest\screens_Sebastian\040702\customize_new.html  Go  Links
```

Home | Help Center | Contact Us | Locations | Site Map | Apply | Sign Off

WELLS FARGO

- Account Summary
- Brokerage
- Bill Pay
- Transfer
- Account Services
- My Message Center

Customize Your Report

Uncheck the accounts and/or cards you want to remove from your report.

*660*

- ☑ Credit Card-Mastercard 5332 2223 1234 xxxx
- ☑ Credit Card-Visa 5332 2223 1234 xxxx
- ☑ Checking 0335 405xxx
- ☑ Checking 0335 023xxx
- ☑ Checking 0335 404xxx

*661*

[ Submit ]

Account Summary | Brokerage | Bill Pay | Transfers | My Message Center | Sign Off
Home | Map Center | Contact Us | Locations | Site Map | Apply @1995-2004 Wells Fargo. All rights reserved.

---

```
Site - Microsoft Internet Explorer
File  Edit  View  Favorites  Tools  Help
Back Forward Stop Refresh Home  Search  Favorites Fill Screen Print
Address F:/Combined Spending Reports\Business Requirements\Screens\Latest\screens_Sebastian\040702\customize_new.html  Go  Links
```

Home | Help Center | Contact Us | Locations | Site Map | Apply | Sign Off

WELLS FARGO

- Account Summary
- Brokerage
- Bill Pay
- Transfer
- Account Services
- My Message Center

Customize Your Report

Uncheck the accounts and/or cards you want to remove from your report.

- ☑ Credit Card-Mastercard 5332 2223 1234 xxxx
- ☑ Credit Card-Visa 5332 2223 1234 xxxx
- ☑ Checking 0335 405xxx
- ☑ Checking 0335 023xxx
- ☑ Checking 0335 404xxx

[ Submit ]

Account Summary | Brokerage | Bill Pay | Transfers | My Message Center | Sign Off
Home | Map Center | Contact Us | Locations | Site Map | Apply @1995-2004 Wells Fargo. All rights reserved.

METHOD AND APPARATUS FOR FACILITATING DATA MANAGEMENT

CROSS-REFERENCE TO RELATED PATENT APPLICATIONS

This application is a continuation of U.S. application Ser. No. 11/115,869, filed Apr. 26, 2005, which claims the benefit of U.S. Provisional Application No. 60/598,330, filed Aug. 2, 2004, both of which are incorporated by reference herein in their entireties.

TECHNICAL FIELD

The invention relates generally to the field of network-based communications. More particularly, this invention relates to a method and apparatus for facilitating data management over a network, such as the Internet.

BACKGROUND

The explosive growth of the Internet as a publication and interactive communication platform has created an electronic environment that is changing the way business is transacted. As the Internet becomes increasingly accessible around the world, online communications and business transactions increase exponentially.

Several attempts have been made to facilitate online management of financial data using such network-based communications, namely to provide software packages residing on a computer and configured, for example, to acquire data from network-based financial transaction facilities, and to facilitate organization and management of such data over the network. However, such packages do not provide a satisfactory level of data access and/or detail. For example, many of the current software applications rely on preparation and display of transaction lists, such as credit card monthly statements and/or bank account statements, but do not provide a system to organize such transactions. Other software applications allow categorization of transactions, but require user input and data downloading prior to such user-defined operations. Thus, what is needed is a method and apparatus that facilitate real-time data retrieval, organization, and management over a network, such as the Internet.

SUMMARY

A method and apparatus for facilitating data management over a network are described. In one preferred embodiment, a request to display aggregate transaction data for a user is received, the aggregate transaction data containing data related to multiple disparate transactions organized into categories based on corresponding category codes and transaction codes associated with each transaction. The aggregate transaction data are retrieved from a database. A report containing the aggregate transaction data is generated and displayed for the user in a user interface area.

BRIEF DESCRIPTION OF THE DRAWINGS

FIGS. 7A through 7D illustrate exemplary interfaces for facilitating data management according to an exemplary embodiment of the invention;

DETAILED DESCRIPTION OF EXEMPLARY EMBODIMENTS

Figure 1:
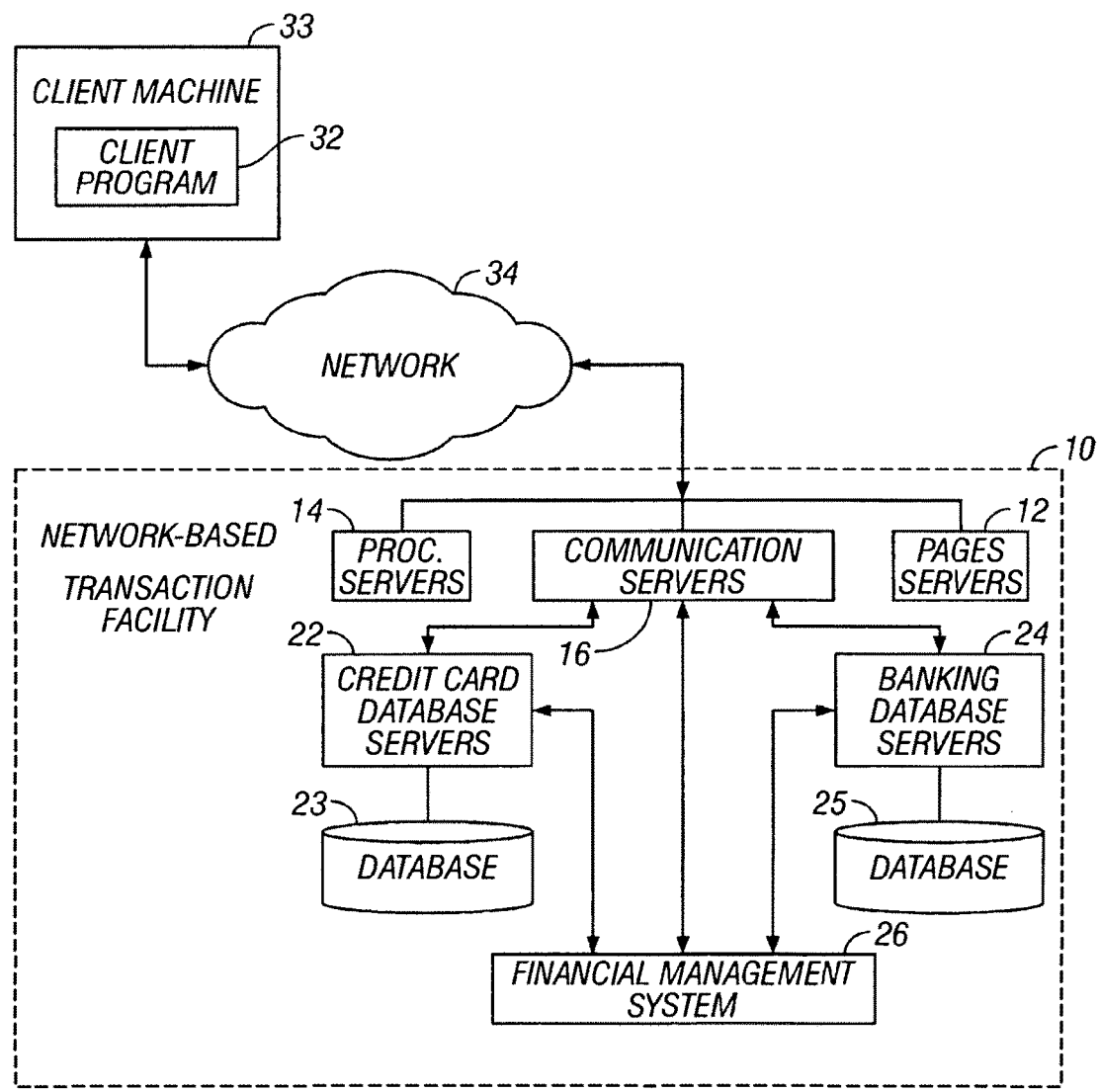
FIG. 1 is a block diagram illustrating an exemplary network-based transaction and communications facility, which facilitates data management according an exemplary embodiment of the invention.

FIG. 1 is a block diagram illustrating an exemplary network-based transaction and communications facility 10, such as, for example, a financial transaction facility, which facilitates transactions and communications with users and further facilitates data management according to the invention. While an exemplary embodiment of the invention is described within the context of a financial transaction and communications facility 10, it will be appreciated by those skilled in the art that the invention will find application in many different types of computer-based, and network-based, commerce facilities.

The facility 10 includes one or more of a number of types of front-end Web servers, namely, for example, pages servers 12, which deliver Web pages to multiple users, for example markup language documents, and processing servers 14, such as, for example, Common Gateway Interface (CGI) servers or Internet Server Application Program Interface (ISAPI) servers, which provide an intelligent interface to the back-end of the facility 10. In addition, the facility 10 may include communication servers 16 that provide, inter alia, automated communications, such as, for example, electronic mail (email) communications to/from users, and/or instant messaging (IM) functionality, to/from users of the facility 10.

The facility 10 further includes one or more back-end servers, for example, a credit card database server 22, a banking database server 24, each of which maintains and facilitates access to a respective database 23, 25 and a data management system, such as, for example, a financial management system 26, which will be described in further detail below.

The network-based facility 10 may be accessed by a client program 32, such as a browser, for example the Internet Explorer browser distributed by Microsoft Corporation of Redmond, Wash., which executes on a client machine 33 and accesses the facility 10 via a network 34, such as, for example, the Internet. Other examples of networks that a client may use to access the facility 10 include a wide area network (WAN), a local area network (LAN), a wireless network, e.g. a cellular network, or other known networks.

Figure 2:
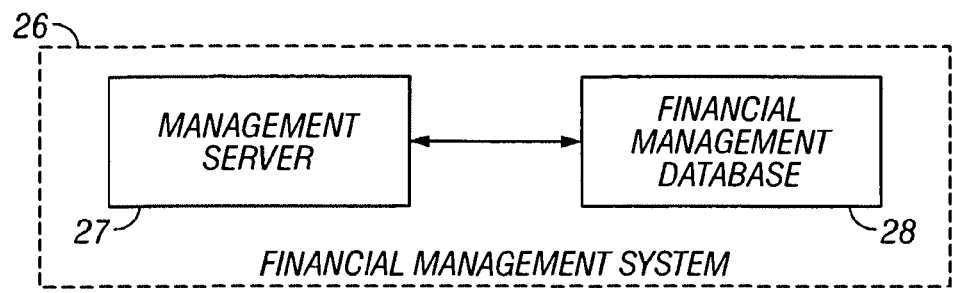
FIG. 2 is a block diagram illustrating a data management system within the network-based transaction and communications facility according to an exemplary embodiment of the invention.

FIG. 2 is a block diagram illustrating a data management system within the network-based transaction and communications facility according to an exemplary embodiment of the invention. As illustrated in FIG. 2, in one preferred embodiment, the financial management system 26 includes one or more back-end management servers, of which management server 27 is shown, which maintain and facilitate access to a financial management database 28. The management server 27 and the database 28 at least partially implement and support the network-based facility 10 and are specifically provided to enable an exemplary embodiment of the present invention, as described in further detail below.

Figure 3:
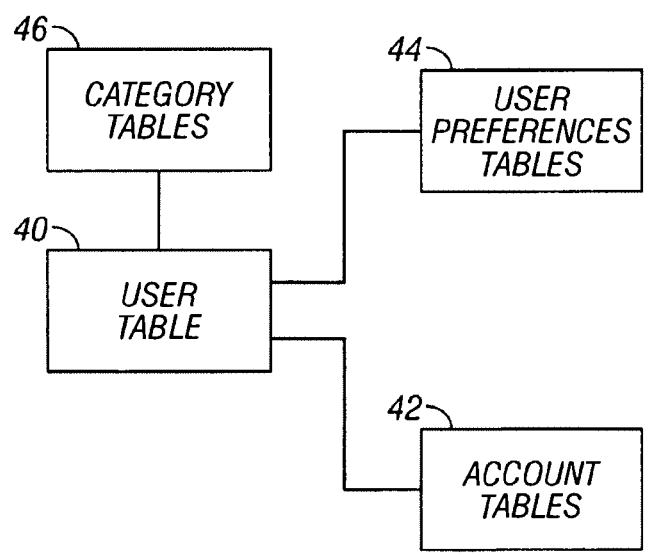
FIG. 3 is a block diagram illustrating a management database, maintained by and accessed via a processing server within the data management system, which at least partially implements and supports the data management system according to an exemplary embodiment of the invention.

FIG. 3 is a block diagram illustrating a management database 28, maintained by and accessed via management server 27 within the data management system 26, according to an exemplary embodiment of the invention. The database 28 may, in one embodiment, be implemented as a relational database, and includes a number of tables having entries, or records, that are linked by indices and keys. In an alternative embodiment, the database 28 may be implemented as a collection of objects in an object-oriented database.

Central to the database 28 shown in FIG. 3 is a user table 40, which contains records for each entity or user of the facility 10. The database 28 also includes an accounts table 42, which may be linked to the user table 40 and may be populated with account information and data related to each user of the network-based facility 10.

The database 28 may include a number of other tables, which may also be shown to be linked to the user table 40, for example, tables specifically provided to enable an exemplary embodiment of the invention. One or more category tables 46 are configured to store multiple categories and respective category codes used to organize financial transactions associated with each user, as described in further detail below. In one embodiment, the stored categories include, for example, lodging, airlines, auto rental, restaurants, education, services, health care, gas/auto, retail, groceries, other travel/entertainment, other credit card transactions, ATM withdrawals, cash advances, checks written, electronic payments from checking account, transfers of funds, non-card withdrawals from the checking account, and other non-categorized online bill payment transactions. Alternatively, other categories related to financial transactions associated with a user may be stored in the category tables 46.

In one embodiment, user-generated access preferences, such as, for example a data access indicator, which indicates whether the user has access to data provided by the financial management system 26, and/or user-generated communication preferences, such as, for example, an email preference, which indicates whether the user has email notification privileges are stored in a user database within the transaction facility 10, such as, for example, in the banking database 25. All the above preferences are part of a user profile constructed and stored for each user. In an alternate embodiment, the user-generated access preferences and/or the user-generated communication preferences may be stored in one or more user preferences tables 44 within the financial management database 28.

Prior to any communication between client 32 and the network-based facility 10, data related to financial transactions associated with each user are retrieved from respective databases maintained and accessed by the credit card database servers 22 and the banking database servers 24.

Figure 4:
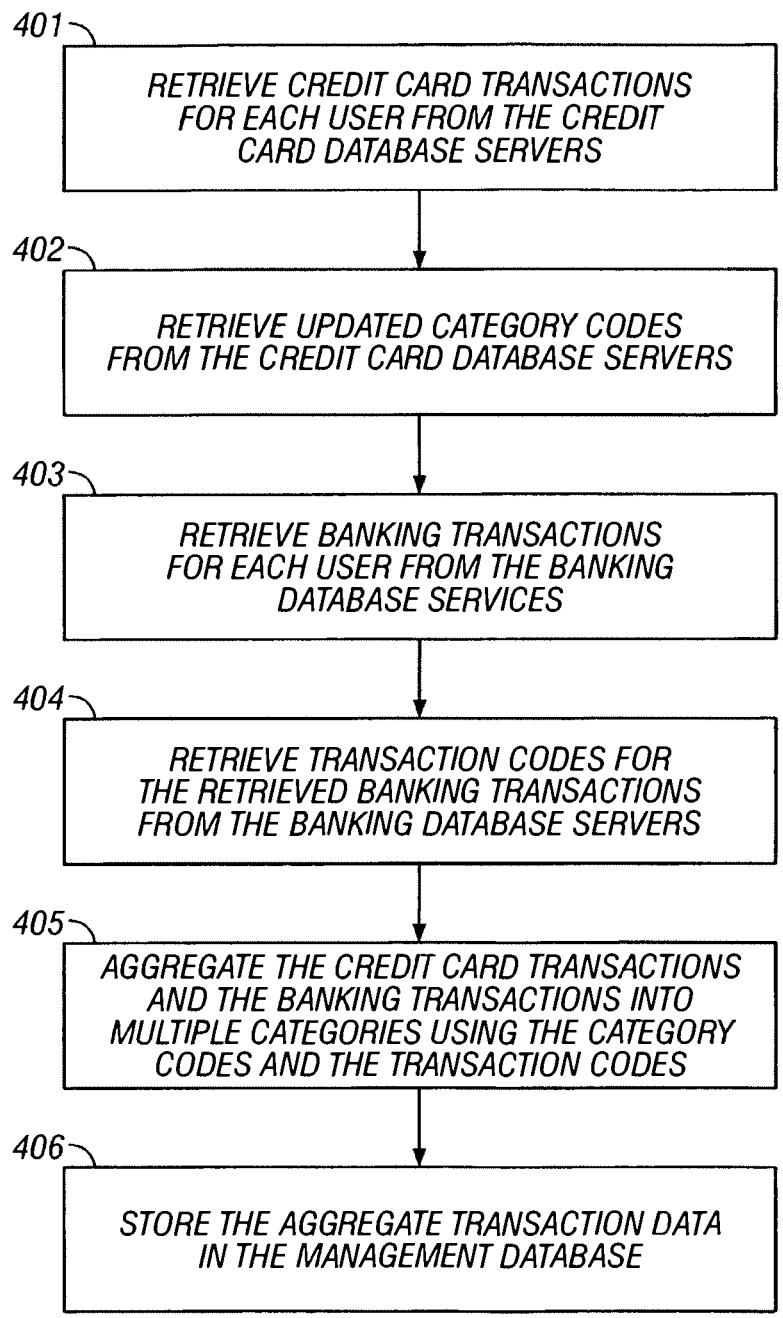
FIG. 4 is a flow diagram illustrating a method for aggregating data according to an exemplary embodiment of the invention.

FIG. 4 is a flow diagram illustrating a method for aggregating data according to an exemplary embodiment of the invention. As illustrated in FIG. 4, at processing block 401, credit card transactions are retrieved for each user from the credit card database servers 22. In one embodiment, the management server 27 requests data related to credit card transactions associated with each user of the facility 10, the credit card transactions being stored in the database 23 associated with the credit card database servers 22. The credit card database servers 22 retrieve the credit card transactions and transmit the related data to the management server 27. Each credit card transaction datum includes, for example, a description of the transaction, the amount of the transaction, the location and date of the transaction, a predetermined credit card transaction code, and other data pertinent to the specific transaction. In an alternate embodiment, the retrieval of credit card transactions information may be performed in real-time during communications between the client 32 and the network-based facility 10.

At processing block 402, updated category codes are retrieved from the credit card database servers 22. In one embodiment, the management server 27 requests the updated category codes from the credit card database servers 22, such as, for example, merchant category codes defined by a merchant segmentation operation. The credit card database servers 22 retrieve the updated category codes from the associated database 23 and transmit the retrieved category codes to the management server 27. In one embodiment, each retrieved category code corresponds to a category used in subsequent aggregation and management of data. In an alternate embodiment, the retrieval of updated category code information may be performed in real-time during communications between the client 32 and the network-based facility 10.

At processing block 403, banking transactions are retrieved for each user from the banking database servers 24. In one embodiment, the management server 27 requests data related to banking transactions associated with each user of the facility 10, the banking transactions being stored in the database 25 associated with the banking database servers 24. The banking database servers 24 retrieve the banking transactions and transmit the related data to the management server 27. In one embodiment, the retrieved banking transactions include, for example, debit account transactions, ATM transactions, check transactions, fund transfer transactions, non-card withdrawal transactions, and other transactions related to bank accounts owned by each user of the facility 10. In an alternate embodiment, the retrieved banking transactions include electronic bill payment transactions associated with each user and stored in the respective database 25. In another alternate embodiment, the retrieval of banking transactions information may be performed in real-time during communications between the client 32 and the network-based facility 10.

At processing block 404, transaction codes for the requested banking transactions are retrieved from the banking database servers 24. In one embodiment, the management server 27 requests the transaction codes associated with the banking transactions from the banking database servers 24. The banking database servers 24 retrieve the transaction codes and transmit the codes to the management server 27. In one embodiment, each banking transaction performed for a user account has an associated banking transaction code, which identifies the particular banking transaction. In an alternate embodiment, the retrieval of the transaction codes may be performed in real-time during communications between the client 32 and the network-based facility 10.

At processing block 405, the data related to the credit card transactions and the data related to the banking transactions are aggregated and organized into multiple categories using the retrieved category codes and transaction codes. In one embodiment, the management server 27 aggregates the retrieved data and organizes data based on the categories stored in the category tables 46.

At processing block 406, the aggregate transaction data are stored in the financial management database 28. In one embodiment, the management server 27 stores the aggregate transaction data into the account tables 44 within the database 28.

According to an exemplary embodiment of the invention, the retrieval and processing of data related to financial transactions of each user are performed prior to any communication between client 32 and the network-based facility 10. The management server 27 retrieves financial transaction information performed during a predetermined period of time, for example credit card transactions and banking transactions performed within the previous sixty days. Alternatively, the management server 27 may retrieve financial transaction information performed within any predetermined amount of time. In an alternate embodiment, subsequent to the initiation of communications between the client 32 and the network-based facility 10, the retrieval and processing of data related to financial transactions of each user are performed in real-time, allowing each user to access the updated data in real-time.

Figure 5:
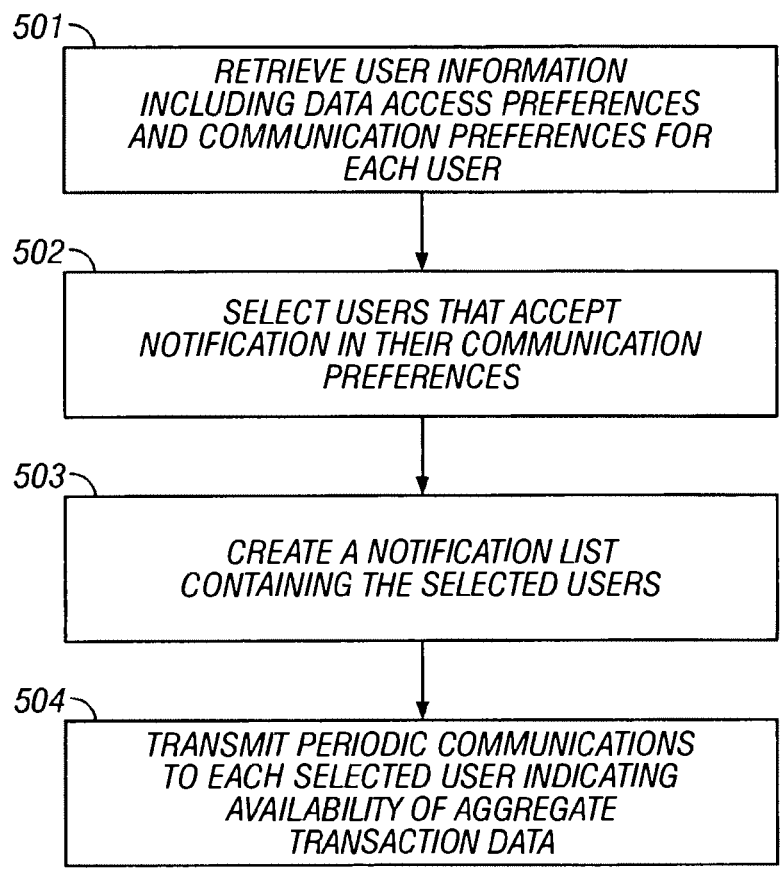
FIG. 5 is a flow diagram illustrating a method for transmitting communications to users indicating availability of aggregate data according to an exemplary embodiment of the invention.

According to an exemplary embodiment of the invention, electronic communications are exchanged between the facility 10 and the client 32 to indicate to each user the availability of the aggregate transaction data, as described in further detail below. FIG. 5 is a flow diagram illustrating a method for transmitting communications to users indicating availability of aggregate transaction data, according to an exemplary embodiment of the invention. As illustrated in FIG. 5, at processing block 501, user information including data access preferences and communication preferences for each user are retrieved from the database 25, or, in the alternative, from the management database 28. In one embodiment, the banking database servers 24 access the database 25 and retrieve user information, data access preferences and communication preferences associated with each user.

At processing block 502, users that have not opted out of communications indicating availability of aggregate transaction data and, thus, accept electronic notifications as a communication preference are selected. In one embodiment, the banking database servers 24 select only users that have not opted out of receipt of electronic notifications indicating the availability of aggregate transaction data.

At processing block 503, in one embodiment, the banking database servers 24 create a notification list containing the selected users. Finally, at processing block 504, periodic communications are transmitted to each selected user indicating the availability of aggregate transaction data. In one embodiment, the banking database servers 24 initiate an electronic communication with the client 32 via the communication servers 16 and transmit an email to each selected user indicating the availability of aggregate transaction data. Alternatively, the banking database servers 24 may initiate periodic communications with the client 32 via the communication servers 16 and transmit notifications related to the aggregate transaction data, such as, for example, periodic reminders of data updates or any other types of user notifications.

Figure 6:
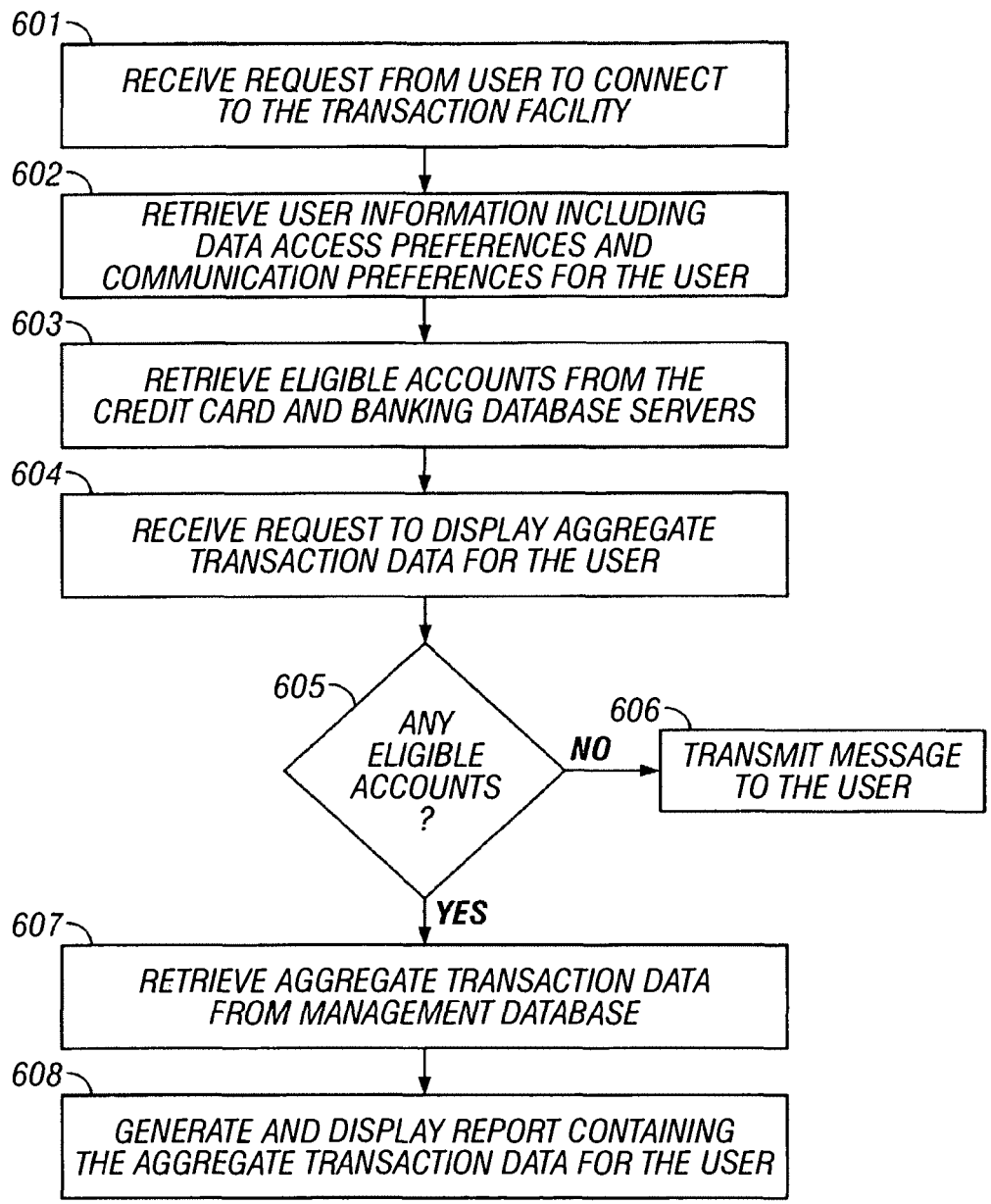
FIG. 6 is a flow diagram illustrating a method for facilitating data management according to an exemplary embodiment of the invention.

FIG. 6 is a flow diagram illustrating a method for facilitating data management according to an exemplary embodiment of the invention. As illustrated in FIG. 6, at processing block 601, a request to connect to the network-based transaction and communications facility 10 is received from a user. In one embodiment, the user initiates a communication with the facility 10 via the client 32 and the communication servers 16 and transmits a request to connect to the facility 10 through an authentication or login procedure.

At processing block 602, user information including data access preferences and communication preferences for each user are retrieved from the database 25 or, in the alternative, from the management database 28. In one embodiment, the banking database servers 24 access the database 25 and retrieve user information, data access preferences, and communication preferences associated with each user. Alternatively, the management server 27 accesses the database 28 and retrieves user information from the user table 40 and data access preferences and communication preferences associated with each user from the user preferences tables 44. The data access preferences indicate whether the user has access to data provided by the financial management system 26. If the user does not have access to data, the management server 27 transmits a message in a message window to the client 32 via the communication servers 16 and the network 34 and denies access to the data.

Otherwise, at processing block 603, eligible accounts associated with the user are retrieved from the databases 23, 25 associated with the credit card database servers 22 and the banking database servers 24, respectively. In one embodiment, subsequent to the receipt of the request to connect to the facility 10, the management server 27 communicates with the credit card database servers 22 and the banking database servers 24 and requests the financial accounts eligible for the data management operations. The respective servers 22 and 24 retrieve corresponding credit card accounts and banking accounts associated with the user and transmit the account information to the management server 27.

At processing block 604, a request to display aggregate transaction data in real-time is received from a user. In one embodiment, the user initiates a communication with the facility 10 via the client 32 and the communication servers 16 and transmits a request to display aggregate transaction data. The management server 27 receives the request from the communication servers 16 and proceeds to display the requested data, as described below.

At processing block 605, a decision is made whether the user has any accounts eligible for real-time data management operations. In one embodiment, the management server 27 makes a determination whether the user has any accounts eligible for data management operations by reviewing the retrieved accounts. If the user does not have any eligible accounts, at processing block 606, the management server 27 transmits a message in a message window to the client 32 via the communication servers 16 and the network 34 and denies access to the data.

Otherwise, if the user has eligible accounts, at processing block 607, aggregate transaction data associated with the eligible accounts of the user is retrieved. In one embodiment, the management server 27 accesses the management database 28 and retrieves the aggregate transaction data associated with the eligible accounts of the user from the account tables 42 within the database 28.

Finally, at processing block 608, a report containing the aggregate transaction data is generated and displayed for the user. In one embodiment, the management server 27 generates a report containing the aggregate transaction data and transmits the report to the client 32 via the communication servers 16, the pages servers 12, and the network 34. The report is displayed for the user in a report window within a user interface area. The user interface area presented to the user facilitates user interaction and communications with the network-based facility 10, as described in further detail below in connection with FIGS. 7A-7D, 8, and 9.

Figure 7A:

FIGS. 7A-7D illustrate exemplary interfaces for facilitating data management according to an exemplary embodiment of the invention. As illustrated in FIG. 7A, in one embodiment, the facility 10 displays a user interface area 610 in a window within the client machine 33 to facilitate communication of the request to display aggregate transaction information data for the user. The user interface area 610 includes a summary of accounts owned by the user, showing, for example, banking account numbers and balances, credit card account numbers and balances, loan account numbers and balances, and other financial information. The user interface area 610 further includes a link 611, which facilitates transmission of the request to the facility 10. The user selects the "View Spending Report" link 611 with a conventional mouse click command and the client machine 33 transmits the request to the management server 27 via the network 34 and the communication servers 16.

As illustrated in FIG. 7B, in one embodiment, the management server 27 displays the report in a user interface area 620. The user interface area 620 includes a report window 630, a number of command buttons, including, for example, a Customize Report button 632, and a number of window tabs, including a Spending Summary tab 633, a Credit Cards tab 634, a Check Cards tab 635, a Other Checking Activity tab 636, and a Bill Pay tab 637.

In one embodiment, if the Spending Summary tab 633 is activated with a conventional mouse click command, the report window 630 displays aggregate transaction data received from the management server 27. The aggregate transaction data are organized according to categories 640 stored in the category tables 46 within the management database 28. Each category 640 is an interactive link configured to facilitate further user interaction.

Figure 7D:
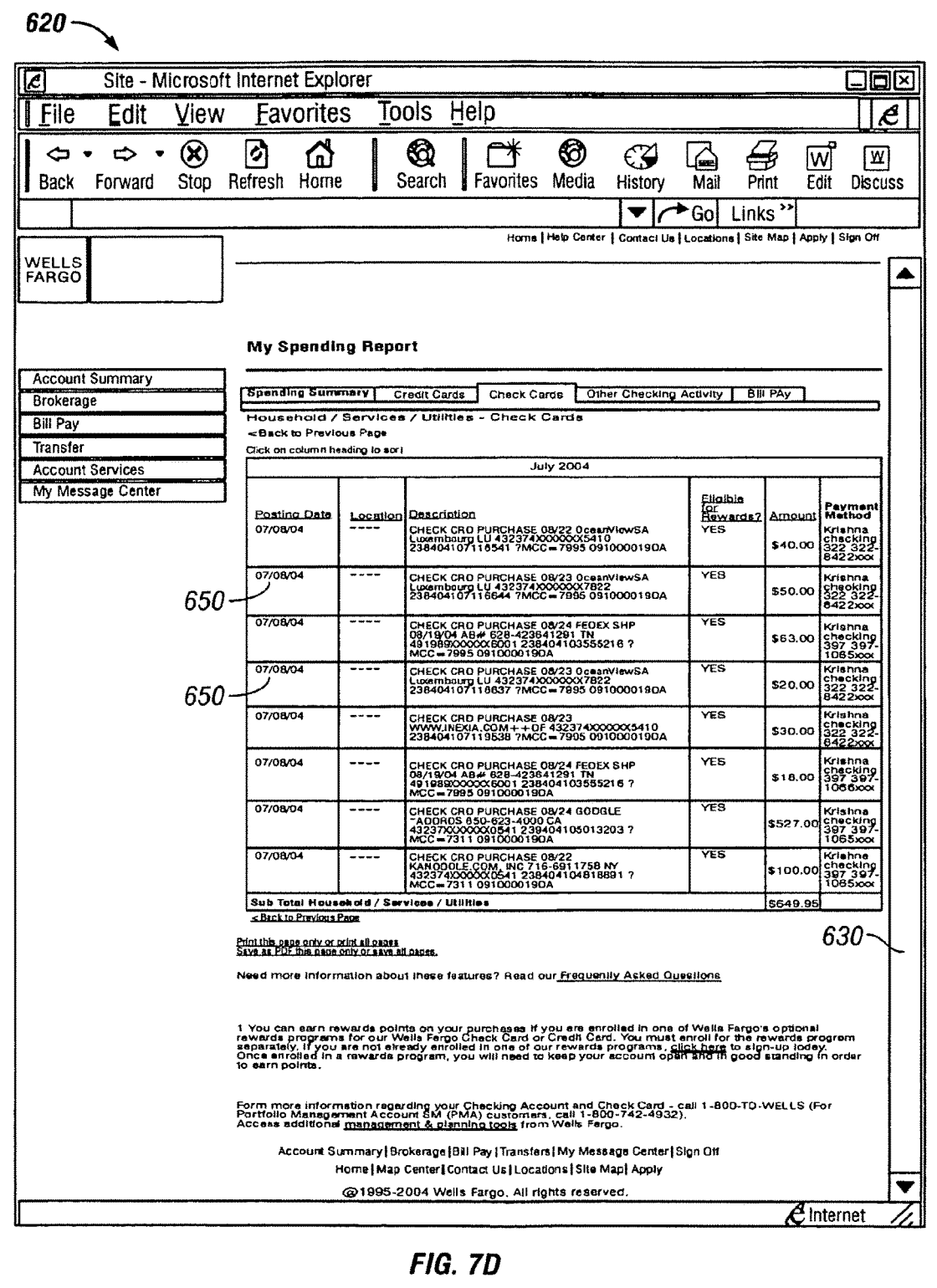

If the user activates one of the other tabs 634-637 with a conventional mouse click command, the report window 630 displays statements corresponding to respective credit card accounts, check card accounts, checking accounts, and/or bill pay accounts. As illustrated in FIG. 7D, if the user activates the Check Cards tab 635, for example, the report window 630 displays detailed individual check card transactions 650.

Figure 8:
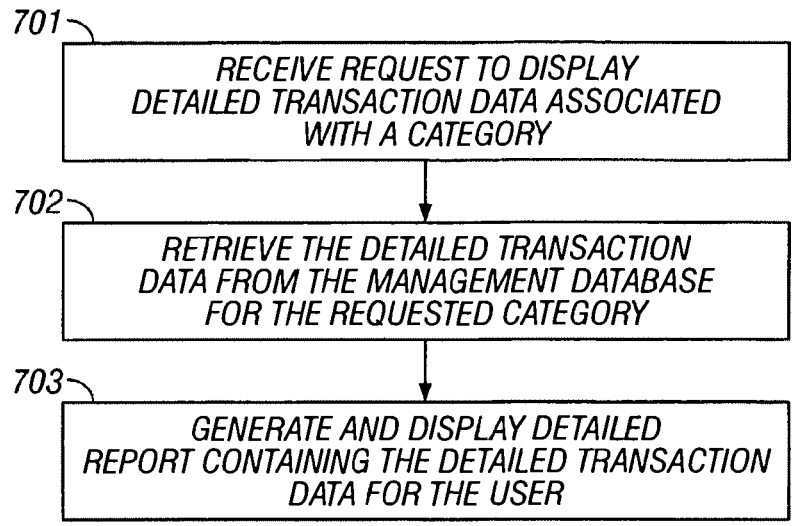
FIG. 8 is a flow diagram illustrating a method for facilitating display of detailed aggregate data according to an exemplary embodiment of the invention.

FIG. 8 is a flow diagram illustrating a method for facilitating display of detailed aggregate data according to an exemplary embodiment of the invention. As illustrated in FIG. 8, at processing block 701, a request to display detailed transaction data associated with a category is received. In one embodiment, referring also to FIG. 7B, the user selects an amount link 641 corresponding to a category 640 with a conventional mouse click command. Responsive to selection of the link 641, the client 32 transmits the request to display detailed transaction data associated with the category through the network 34 and the communication servers 16.

At processing block 702, the detailed transaction data for the requested category are retrieved from the management database 28. In one embodiment, the management server 27 receives the request from the client 32 and retrieves the detailed transaction data associated with the selected category from the account tables 42.

At processing block 703, a detailed report containing the detailed transaction data are generated and displayed for the user. In one embodiment, the management server 27 generates the detailed report containing the detailed transaction data and transmits the report to the client 32 via the communication servers 16, the pages servers 12, and the network 34. The detailed report is displayed for the user in a separate detailed report window (not shown) within the user interface area 620 shown in FIG. 7B.

Figure 9:
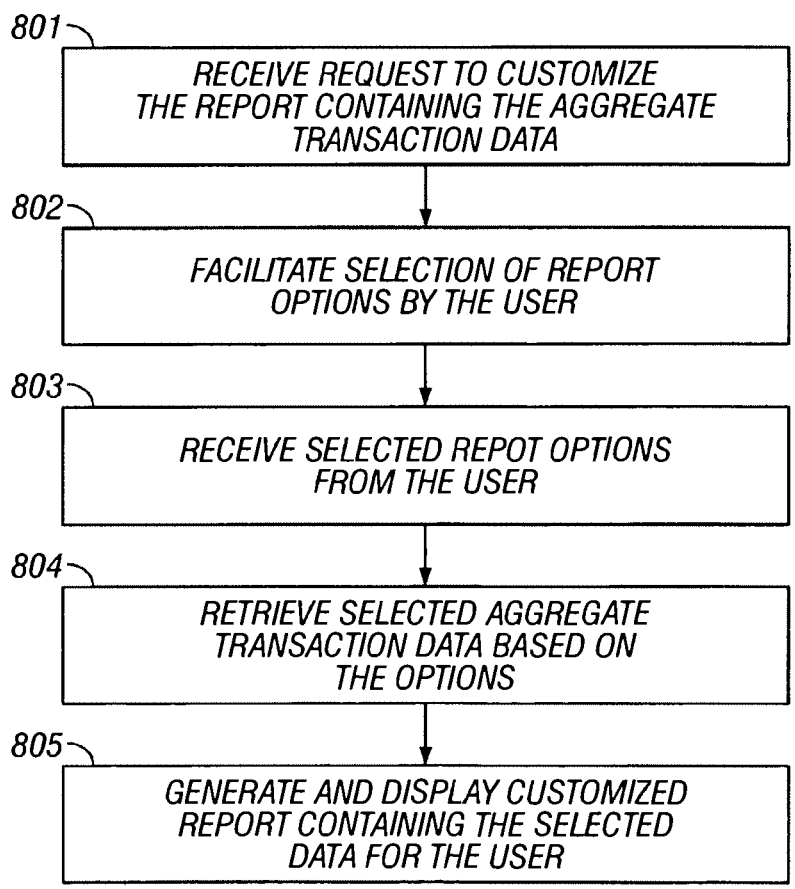
FIG. 9 is a flow diagram illustrating a method for facilitating customization of the aggregate data based on user input according to an exemplary embodiment of the invention.

FIG. 9 is a flow diagram illustrating a method for facilitating customization of the aggregate data based on user input according to an exemplary embodiment of the invention. As illustrated in FIG. 9, at processing block 801, a request to customize and display the report containing the aggregate transaction data is received. In one embodiment, referring also to FIG. 7B, the user selects the Customize Report link 632 with a conventional mouse click command. Responsive to selection of the link 632, the client 32 transmits the request to customize and display the report containing the aggregate transaction data through the network 34.

At processing block 802, the management server 27 facilitates selection of report options by the user. As illustrated in FIG. 7C, in one embodiment, subsequent to the receipt of the request to customize and display the report containing the aggregate transaction data, the management server 27 generates and displays an option window 660 in the user interface area 620. The option window 660 includes a number of customizing report options, such as, for example, a list of banking and/or credit card accounts 661, and facilitates selection by the user of one or more accounts that the user wants removed and/or added from the report containing the aggregate data.

Subsequent to selection of options with a conventional mouse click command, the client 32 transmits the selected options to the facility 10 via the network 34. At processing block 803, the management server 27 receives the selected report options transmitted by the client 32.

At processing block 804, selected aggregate transaction data are retrieved based on the report options. In one embodiment, the management server 27 applies the customizing report options to the current communication session with the client 32 and retrieves selected aggregate transaction data from the account tables 42 within the management database 28 based on the specific accounts selected by the user.

At processing block 805, a customized report containing the selected aggregate transaction data is generated and displayed for the user. In one embodiment, the management server 27 generates the customized report containing the selected data and transmits the report to the client 32 via the communication servers 16, the pages servers 12, and the network 34. The customized report is displayed for the user in a separate customized report window (not shown) within the user interface area 620 shown in FIG. 7B.

In an alternate embodiment, the option window 660 may include additional customizing report options to facilitate creation and display of various customized reports for the user. For example, the option window 660 may include a list of check card accounts, and/or other loan accounts associated with the user.

In another alternate embodiment, the option window 660 may facilitate user selection of an option to display detailed transactional information in its entirety over a significant period of time, such as, for example a rolling 13-month period of historical data. In yet another embodiment, the option window 660 may enable the user to compare a predetermined period of time from a current year with a similar period from a previous year, and produce profiles of financial expenditures, such as month-over-month, year-over-year, or year-to-date.

In another embodiment, the option window 660 may allow the user to save and retrieve report views, eliminating the need to recreate the report views during subsequent sessions. Users are given the option to save the customized report view as a default view, which then applies on a go-forward basis or until the user changes the selected report view. The management server 27 receives the saved customized report view and stores the report view as the default view in the management database 28.

In yet another embodiment, the option window 660 may enable the user to enter and save a budget amount for each predefined category 640 in order to track variances. The management server 27 receives the saved budget amounts and stores the budget amounts in connection with the respective categories 640 in the management database 28.

In yet another embodiment, the option window 660 may facilitate reclassification of individual transactions 650 to a different category 640, including past transactions stored in the database 28. The management server 27 may store the reclassified transactions in the database 28 and may also re-categorize the respective vendor/payee on a go-forward basis.

In yet another embodiment, the user interfaces 610 and 620, and the windows 630, 660, may include a link to other marketing or product-related sites of the facility 10 to facilitate user navigation to the respective sites.

In yet another embodiment, the option window 660 may enable the user to create custom categories 640 and to store the custom categories in the database 28 through the management server 27.

Figure 10:
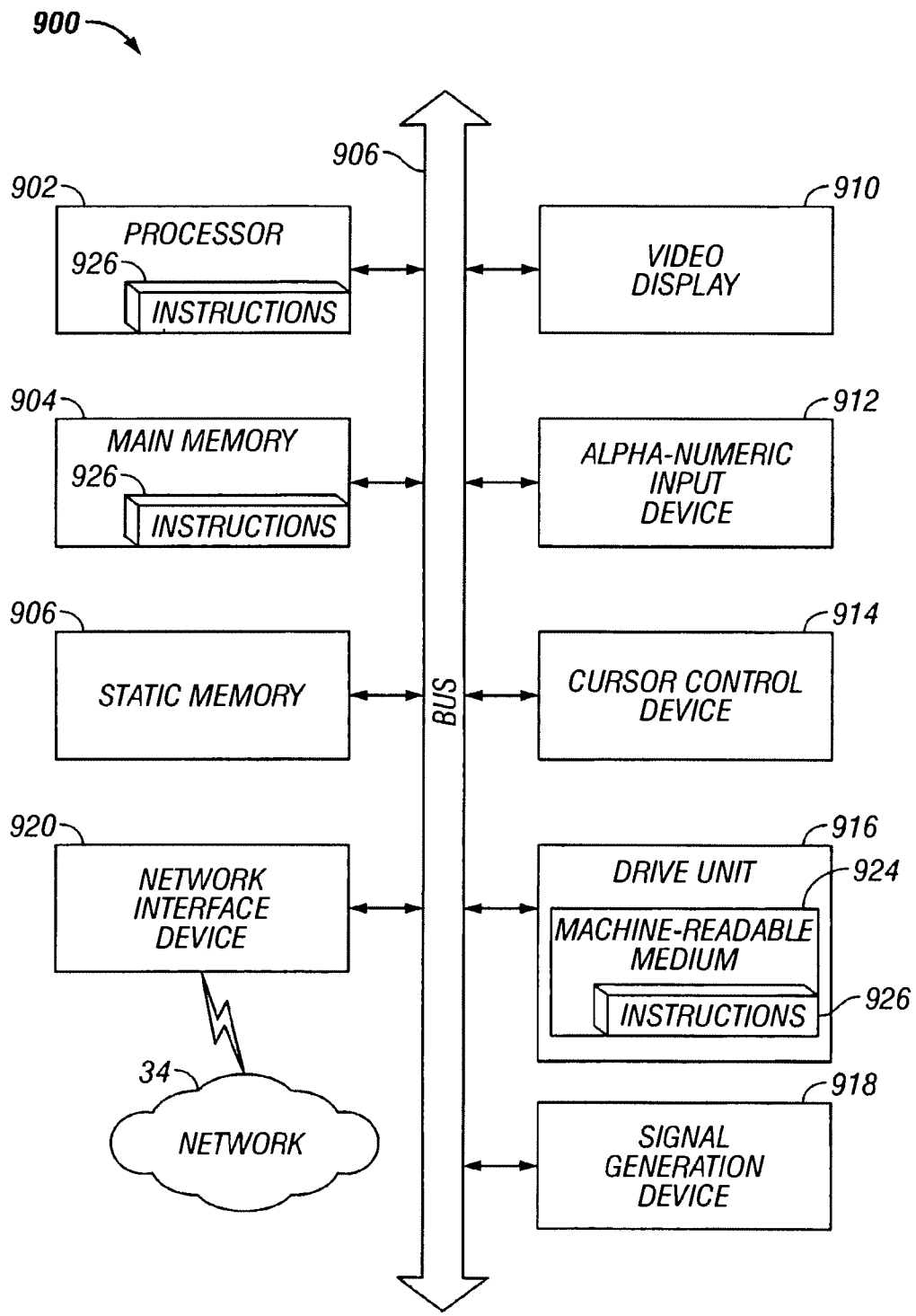
FIG. 10 is a diagrammatic representation of a machine in the exemplary form of a computer system within which a set of instructions may be executed.

FIG. 10 shows a diagrammatic representation of a machine in the exemplary form of a computer system 900 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a Web appliance or any machine capable of executing a sequence of instructions that specify actions to be taken by that machine.

The computer system 900 includes a processor 902, a main memory 904 and a static memory 906, which communicate with each other via a bus 908. The computer system 900 may further include a video display unit 910, e.g. a liquid crystal display (LCD) or a cathode ray tube (CRT). The computer system 900 also includes an alphanumeric input device 912, e.g. a keyboard, a cursor control device 914, e.g. a mouse, a disk drive unit 916, a signal generation device 918, e.g. a speaker, and a network interface device 920.

The disk drive unit 916 includes a machine-readable medium 924 on which is stored a set of instructions, i.e. software, 926 embodying any one, or all, of the methodologies described above. The software 926 is also shown to reside, completely or at least partially, within the main memory 904 and/or within the processor 902. The software 926 may further be transmitted or received via the network interface device 920.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, e.g. carrier waves, infrared signals, digital signals, etc.; or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended Claims. The specification and drawings are, accordingly, to be regarded in an illustrative sense rather than a restrictive sense.

What is claimed is:

1. A computer-implemented system for facilitating data management, and categorizing financial transactions and recategorizing historic financial transactions, comprising:
   a database system comprising a database, the database system being configured to store:
      transaction data for a plurality of different financial transactions, the transaction data including user transaction data for a user having a plurality of different accounts, wherein the plurality of different financial transactions comprise bank account transactions and credit card transactions, and
      category codes usable to categorize the financial transactions into a plurality of categories, wherein the bank account transactions are associated with banking transaction codes and the credit card transactions are associated with credit card transaction codes and the category codes; and
   a server system comprising a server, the server system being coupled to the database system, wherein the server system:
      categorizes the plurality of financial transactions into a plurality of categories based on the transaction data, the banking transaction codes, the credit card transaction codes, and the category codes, wherein the plurality of categories include different merchant categories;
      receives a request from the user to display the user transaction data;
      receives user selections to customize content of a first report showing the user transaction data regarding the financial transactions;
      retrieves the user transaction data and the category codes from the database system;
      generates the first report showing the user transaction data regarding the financial transactions, the first report showing the categorization of the plurality of financial transactions into the plurality of categories, the first report being customized in accordance with the user selections, the first report including links associated with the plurality of different categories which may be selected by the user for further user interaction with the first report; and provides a display of the first report to the user;

wherein the first report permits a user to reclassify a transaction to a different one of the plurality of categories;

wherein the server system updates the plurality of categories to associate a merchant associated with the transaction with the different one of the plurality of categories according to the reclassification by the user, and the server system further recategorizes historical financial transactions involving the merchant based on the reclassification of the transaction by the user and categorizes future financial transactions involving the merchant based on the reclassification of the transaction by the user; and wherein the server system updates the first report based on the user selecting which of the plurality of financial accounts are to be included in the first report and includes the reclassification by the user to generate a second report;

wherein the plurality of category codes are usable to categorize the credit card transactions into a plurality of categories including at least one of airlines, auto and gas, education, groceries, health care, services, lodging, restaurants, retail, and non-categorized transactions, and wherein the second report is a default report shown to the user upon a second request from the user to display the user transaction data.

2. The system of claim 1, wherein the user selections are received from the user via the Internet through a browser application; and wherein the report is displayed by the browser application as part of a web page via the Internet.

3. The system of claim 1, wherein the report includes links associated with the plurality of categories that are selected by the user for further user interaction with the report.

4. The system of claim 1, wherein the plurality of categories are updated in real time during communication with the user.

5. A method comprising:

storing transaction data for a plurality of financial transactions in a database, the transaction data including user transaction data for a user having a plurality of different accounts, wherein the plurality of financial transactions comprises bank account transactions and credit card transactions;

storing category codes usable to categorize the financial transactions into a plurality of categories, wherein the bank account transactions are associated with banking transaction codes and the credit card transactions are associated with credit card transaction codes and the category codes;

categorizing the plurality of financial transactions into a plurality of categories based on the transaction data, the banking transaction codes, the credit card transaction codes, and the category codes, wherein the plurality of categories include different merchant categories;

receiving a request from the user to display the user transaction data;

receiving user selections to customize content of a first report showing the user transaction data regarding the financial transactions;

retrieving the user transaction data and the category codes from the database system;

generating the first report showing the user transaction data regarding the financial transactions, the first report showing the categorization of the plurality of financial transactions into the plurality of categories, the first report being customized in accordance with the user selections, the first report including links associated with the plurality of different categories which may be selected by the user for further user interaction with the first report; and providing a display of the first report to the user;

recategorizing a transaction to a different one of the plurality of categories responsive to a user input;

the plurality of categories to associate a merchant associated with the transaction with the different one of the plurality of categories according to the reclassification by the user, and the server system further recategorizes historical financial transactions involving the merchant based on the reclassification of the transaction by the user and categorizes future financial transactions involving the merchant based on the reclassification of the transaction by the user; and updating the first report based on the user selecting which of the plurality of financial accounts are to be included in the first report and includes the reclassification by the user to generate a second report;

wherein the plurality of category codes are usable to categorize the credit card transactions into a plurality of categories including at least one of airlines, auto and gas, education, groceries, health care, services, lodging, restaurants, retail, and non-categorized transactions, and wherein the second report is a default report shown to the user upon a second request from the user to display the user transaction data.

6. The method of claim 5, further comprising:

receiving the user selections from the user via the Internet through a browser application; and displaying the report as part of a web page via the Internet.

7. The method of claim 5, further comprising:

providing links associated with the plurality of categories which are selected by the user for further user interaction with the report.

8. The method of claim 5, further comprising:

updating the plurality of categories in real time during communication with the user;

wherein the plurality of categories include categories associated with different types of merchants.

9. A data management system comprising:

a database system comprising a database, the database system being configured to store:

transaction data for a plurality of different financial transactions, the transaction data including user transaction data for a user having a plurality of different accounts, wherein the plurality of different financial transactions comprise bank account transactions and credit card transactions, and category codes usable to categorize the financial transactions into a plurality of categories, wherein the bank account transactions are associated with banking transaction codes and the credit card transactions are associated with credit card transaction codes and the category codes; and a server system comprising a server, the server system being coupled to the database system, wherein the server system:

categorizes the plurality of financial transactions into a plurality of categories based on the transaction data, the banking transaction codes, the credit card transaction codes, and the category codes, the plurality of categories including categories associated with different types of merchants;

receives a request from the user to display the user transaction data;

receives user selections to customize content of a first report showing the user transaction data regarding the financial transactions;

retrieves the user transaction data and the category codes from the database system;

generates the first report showing the user transaction data regarding the financial transactions, the first report showing the categorization of the plurality of financial transactions into the plurality of categories the first report being customized in accordance with the user selections, the first report including links associated with the plurality of different categories which may be selected by the user for further user interaction with the first report;

provides a display of the first report to the user;

receives a user input recategorizing a transaction to a different one of the plurality of categories, the transaction being associated with a merchant;

updates the first report to reflect the recategorization of the transaction; and updates the plurality of categories to associate a merchant associated with the transaction with the different one of the plurality of categories according to the reclassification by the user, recategorizes historical financial transactions involving the merchant based on the reclassification of the transaction by the user and categorizes future financial transactions involving the merchant based on the reclassification of the transaction by the user; and updates the first report based on the user selecting which of the plurality of financial accounts are to be included in the first report and includes the reclassification by the user to generate a second report;

wherein the plurality of category codes are usable to categorize the credit card transactions into a plurality of categories including at least one of airlines, auto and gas, education, groceries, health care, services, lodging, restaurants, retail, and non-categorized transactions, and wherein the second report is a default report shown to the user upon a second request from the user to display the user transaction data.

10. The system of claim 9, wherein the server system is further configured to
receive user selections to customize content of the report;
wherein the report is customized in accordance with the user selections.

11. The system of claim 9, wherein the server system is further configured to receive a user-created custom category and update the plurality of categories to include the user-created custom category.

12. The system of claim 9,
wherein the plurality of different categories include at least one of airlines, auto and gas, education, groceries, health care, services, lodging, restaurants, retail, and non-categorized transactions.

13. The system of claim 9,
wherein the user selections are received from the user via the Internet through a browser application; and
wherein the report is displayed by the browser application as part of a web page via the Internet.

* * * * *